(12) United States Patent
Unuma et al.

(10) Patent No.: US 10,466,690 B2
(45) Date of Patent: Nov. 5, 2019

(54) DAMAGE ESTIMATION DEVICE

(71) Applicant: Hitachi, Ltd., Chiyoda-ku, Tokyo (JP)

(72) Inventors: Munetoshi Unuma, Tokyo (JP); Yasuki Kita, Tokyo (JP); Takashi Saeki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/540,275

(22) PCT Filed: Jan. 21, 2015

(86) PCT No.: PCT/JP2015/051437
§ 371 (c)(1),
(2) Date: Jun. 28, 2017

(87) PCT Pub. No.: WO2016/117041
PCT Pub. Date: Jul. 28, 2016

(65) Prior Publication Data
US 2018/0024544 A1    Jan. 25, 2018

(51) Int. Cl.
*G05B 23/02* (2006.01)
*B60R 16/023* (2006.01)
(Continued)

(52) U.S. Cl.
CPC ...... *G05B 23/0283* (2013.01); *B60R 16/0234* (2013.01); *G06Q 10/20* (2013.01);
(Continued)

(58) Field of Classification Search
USPC ...................................................... 701/29.4
See application file for complete search history.

(56) References Cited

U.S. PATENT DOCUMENTS

| 2002/0128790 A1* | 9/2002 | Woodmansee | B23P 6/002 702/81 |
| 2008/0195365 A1 | 8/2008 | Ohkura et al. | |

(Continued)

FOREIGN PATENT DOCUMENTS

| JP | 2012-233336 A | 11/2012 |
| JP | 2013-33431 A | 2/2013 |
| WO | WO 2005/106139 A1 | 11/2005 |

OTHER PUBLICATIONS

International Search Report (PCT/ISA/210) issued in PCT Application No. PCT/JP2015/051437 dated Mar. 31, 2015 with English translation (four (4) pages).

(Continued)

*Primary Examiner* — Tyler D Paige
(74) *Attorney, Agent, or Firm* — Crowell & Moring LLP

(57) ABSTRACT

According to the present invention, the work status at an actual site is represented using a combination of component statuses. A degree of damage that takes into account the manner of use at the actual site is predicted by associating test data collected in a component status test. The objective of the present invention is to estimate, with high accuracy, the degree of damage to a device operating in an actual environment. In order to achieve this objective, this damage estimation device is provided with: a component status classification processing unit that classifies the operating status of a device; a component status characteristic amount storage unit that stores a characteristic amount for classification processing by the component status classification processing unit; and a damage degree storage unit for each component status, said damage degree storage unit storing the degree of damage to various regions of a device for each component status, wherein the degree of damage is measured in advance for each component status or is calculated using a simulation. The damage estimation device is char- (Continued)

acterized by collecting sensor/control data required for device status classification, classifying component status using the component status classification processing unit, calculating the classified result and the degree of damage corresponding to said result using the damage degree storage unit for each component status, and outputting the degree of damage.

20 Claims, 10 Drawing Sheets

(51) Int. Cl.
| | | |
|---|---|---|
| *H04L 29/08* | (2006.01) | |
| *G07C 3/00* | (2006.01) | |
| *G07C 5/00* | (2006.01) | |
| *G06Q 10/00* | (2012.01) | |

(52) U.S. Cl.
CPC .............. *G07C 3/00* (2013.01); *G07C 5/006* (2013.01); *H04L 67/12* (2013.01)

(56) References Cited

U.S. PATENT DOCUMENTS

| | | | |
|---|---|---|---|
| 2010/0100338 A1* | 4/2010 | Vik | G01M 5/0033 702/42 |
| 2012/0271587 A1* | 10/2012 | Shibuya | G05B 23/0229 702/127 |
| 2013/0159240 A1* | 6/2013 | Singh | G05B 23/0275 706/51 |
| 2014/0052299 A1 | 2/2014 | Suzuki et al. | |
| 2014/0195184 A1* | 7/2014 | Maeda | G01D 18/006 702/85 |
| 2015/0286994 A1* | 10/2015 | Elder | G06Q 10/20 705/305 |
| 2017/0372534 A1* | 12/2017 | Steketee | G06Q 10/087 |
| 2018/0005461 A1* | 1/2018 | Steketee | G06Q 10/087 |

OTHER PUBLICATIONS

Japanese-language Written Opinion (PCT/ISA/237) issued in PCT Application No. PCT/JP2015/051437 dated Mar. 31, 2015 (five (5) pages).

* cited by examiner

FIG. 5

| STATUS | ENGINE START | STOPPED STATUS | ROARING START | UNIFORM TRAVELING | SUDDEN BRAKING | STOPPED STATUS |
|---|---|---|---|---|---|---|
| DEGREE OF DAMAGE OF REGION A | 1.4e-16 | 3.2e-15 | 1.2e-10 | 8.5e-11 | 1.5e-10 | 3.2e-15 |
| DEGREE OF DAMAGE OF REGION B | 5.2e-15 | 7.5e-15 | 2.3e-8 | 6.5e-11 | 5.2e-12 | 7.5e-15 |
| DEGREE OF DAMAGE OF EACH REGION | DEGREE OF DAMAGE DURING ENGINE START | DEGREE OF DAMAGE DURING STOPPED STATUS | DEGREE OF DAMAGE DURING ROARING START | DEGREE OF DAMAGE DURING UNIFORM TRAVELING | DEGREE OF DAMAGE DURING SUDDEN BRAKING | DEGREE OF DAMAGE DURING STOPPED STATUS |

TIME CHANGE →

50, 51, 52, 53

DAMAGE ESTIMATION DEVICE

TECHNICAL FIELD

The present invention relates to a method and device of estimating the degree of damage to a device during operation.

BACKGROUND ART

As a related technology in the field of the present technology, [PTL 1] is known. The gazette classifies the mode of use of machines into trends of load like the high-load type, low-load type, and loading type based on sensor/control data. Estimating the optimum maintenance cycle such as advancing the inspection period based on the classification result is described.

CITATION LIST

Patent Literature

PTL 1: JP 2013-33431A

SUMMARY OF INVENTION

Technical Problem

An object of the present invention is to estimate the degree of damage to a device operating in an actual environment with high accuracy.

In [PTL 1], the inspection period is changed by classifying the operating status by type into the high-load type and low-load type, but no ground for advancing the inspection period is described. That is, in the case of the high-load type, machines are overused and it appears that a failure can more likely be prevented by conducting inspection earlier, but the precise inspection period cannot be determined because no ground is given for advancing how much compared with the low-load type.

The present invention provides a technology that estimates the degree of damage to a device operating in an actual environment with high accuracy.

Solution to Problem

In order to achieve the object, a damage estimation device according to the present invention includes: a component status classification processing unit that classifies an operating status; a component status characteristic amount storage unit that stores a characteristic amount for classification processing by the component status classification processing unit; and a damage degree storage unit for each component status that stores a degree of damage of various regions of the device for each component status, the degree of damage being measured or calculated using a simulation in advance for each component status, wherein the damage estimation device collects sensor/control data required for device status classification, classifies the component status using the component status classification processing unit, calculates a classified result and the degree of damage corresponding thereto using the damage degree storage unit for each component status, and outputs the degree of damage.

Also, in the damage estimation device according to the present invention, the degree of damage output and an item of the component status classified are stored in a component status/damage history accumulation unit and based on an accumulation result, a frequency distribution of the component status is created.

Also, in the damage estimation device according to the present invention, from the frequency distribution of the component status created, integrated damage of each region is output for each component status.

Also, in the damage estimation device according to the present invention, an effective component status to reduce a degree of integrated damage is output based on the degree of the integrated damage of each region for each of the component status.

Also, in order to achieve the object, a damage estimation device according to the present invention includes: a component status classification processing unit that classifies an operating status of a device; a component status characteristic amount storage unit that stores a characteristic amount for classification processing by the component status classification processing unit; and a damage degree storage unit for each component status that stores a degree of damage of various regions of the device for each component status, wherein the degree of damage is measured or calculated using a simulation in advance for each component status, wherein the damage estimation device collects sensor/control data required for device status classification, classifies the component status using the component status classification processing unit, accumulates a classified result in a component status accumulation unit, calculates an accumulated component status and the degree of damage corresponding thereto using the damage degree storage unit for each component status, and creates a frequency distribution of the component status based on an accumulation result.

Also, in the damage estimation device according to the present invention, from the frequency distribution of the component status created, a degree of integrated damage of each region is output for each component status.

Also, in the damage estimation device according to the present invention, an effective component status to reduce the degree of integrated damage is extracted and a notification that the component status will be improved is sent based on the degree of the integrated damage of each region for the each component status created.

Also, in order to achieve the object, a damage estimation device according to the present invention includes: a component status classification processing unit that classifies an operating status of a device; a component status characteristic amount storage unit that stores a characteristic amount for classification processing by the component status classification processing unit; and a damage degree storage unit for each component status that stores a degree of damage of various regions of the device for each component status, the degree of damage being measured or calculated using a simulation in advance for each component status, wherein the damage estimation device collects sensor/control data required for device status classification, classifies the component status using the component status classification processing unit, accumulates a classified result in a component status accumulation unit, calculates an accumulated component status and the degree of damage corresponding thereto using the damage degree storage unit for each component status, and calculates, based on a result of calculation, cumulative damage for each region.

Also, in the damage estimation device according to the present invention, an optimum maintenance cycle or design guidelines are calculated based on a region for which the cumulative damage calculated is accumulated and a remaining life calculated from the cumulative damage.

Also, in order to achieve the object, a damage estimation device according to the present invention includes: a component status classification processing unit that classifies an operating status of a device; a component status characteristic amount storage unit that stores a characteristic amount for classification processing by the component status classification processing unit; a component status accumulation unit that accumulates a result classified by the component status classification processing unit; and a component status accumulation unit that accumulates the component status that changes chronologically of various regions of the device for each component status, the component status being measured or calculated using a simulation in advance for each component status, wherein the damage estimation device collects sensor/control data required for device status classification, classifies the component status using the component status classification processing unit, accumulates a classified result in a component status accumulation unit, refers to the component status accumulated in the component status accumulation unit and a measured data storage unit during a component status test corresponding thereto, and grasps a damage status from physical change information.

Also, in order to achieve the object, a damage estimation method according to the present invention includes: performing component status classification processing of an operating status of a device; storing a characteristic amount of a component status in which a characteristic amount of the component status classification processing is stored; and storing a degree of damage of various regions of the device for each component status, the degree of damage being measured or calculated using a simulation in advance for each component status; collecting sensor/control data required for device status classification; classifying the component status by the component status classification processing; calculating a classified result and the degree of damage corresponding thereto using the degree of damage stored for each component status; and outputting the degree of damage.

Also, in the damage estimation method according to according to the present invention, the degree of damage output and items of the component status classified are accumulated as a component status/damage history and based on an accumulation result, a frequency distribution of the component status is created.

Also, in the damage estimation method according to the present invention, from the frequency distribution of the component status created, integrated damage of each region is output for each component status.

Also, in the damage estimation method according to according to the present invention, an effective component status to reduce a degree of integrated damage is output based on the degree of the integrated damage of each region for the each component status.

Also, in order to achieve the object, a damage estimation method according to the present invention includes: performing component status classification processing of an operating status of a device; storing a characteristic amount of a component status in which a characteristic amount of the component status classification processing is stored; storing a degree of damage of various regions of the device for each component status, the degree of damage being measured or calculated using a simulation in advance for each component status; collecting sensor/control data required for device status classification; classifying the component status by the component status classification processing; accumulating a classified result; calculating an accumulated component status and the degree of damage corresponding thereto using the degree of damage stored for each component status; and creating a frequency distribution of the component status.

Also, in the damage estimation method according to according to the present invention, from the frequency distribution of the component status created, a degree of integrated damage of each region is output for each component status.

Also, in the damage estimation method according to the present invention, an effective component status to reduce the degree of integrated damage is extracted and a notification that the component status will be improved is sent based on the degree of the integrated damage of each region for the each component status created.

Also, in order to achieve the object, a damage estimation method according to the present invention includes: performing component status classification processing of an operating status of a device; storing a characteristic amount of a component status in which a characteristic amount of the component status classification processing is stored; storing a degree of damage of various regions of the device for each component status, the degree of damage being measured or calculated using a simulation in advance for each component status; collecting sensor/control data required for device status classification; classifying the component status by the component status classification processing; accumulating a classified result; calculating an accumulated component status and the degree of damage corresponding thereto using the degree of damage for each component status; and calculating, based on the degree of damage for each component status, cumulative damage for each region.

Also, in the damage estimation method according to present invention, an optimum maintenance cycle or design guidelines are calculated based on a region for which the cumulative damage calculated is accumulated and a remaining life calculated from the cumulative damage.

Also, in order to achieve the object, a damage estimation method according to the present invention includes: performing component status classification processing of an operating status of a device; storing a characteristic amount of a component status in which a characteristic amount of the component status classification processing is stored; accumulating a result classified by the component status classification processing; accumulating the component status that changes chronologically of various regions of the device for each component status, the component status being measured or calculated using a simulation in advance for each component status; collecting sensor/control data required for device status classification; classifying the component status by the component status classification processing; accumulating a classified result; referring to the component status accumulated and measured data during a component status test corresponding thereto, and grasping a damage status from physical change information.

Advantageous Effects of Invention

Test results of a damage test are used and therefore, the damage status that is grounded can be output.

In addition, simplification of the measuring environment, can be cited as another effect of the present invention.

Using the same environment as the measuring environment for a damage test, the damage status can always be estimated by measuring damage data in an actual environment. In the damage test, however, many kinds of sensors are generally mounted on many regions of a device to grasp the damage status of various regions of the device for the test. In a fatigue test, of the body of an automobile, for example, strain gauges are pasted in various locations of the body to measure the status of damage due to stress fatigue to which the body is subjected. Creating the same measuring environment as the above environment for automobiles on the market is not realistic in view of the cost of sensors and data collection and further, in view of the fact that the effect thereof is not discerned.

In the present invention, sensors capable of recognizing the component status during operation of control data is enough. By associating recognition results of the component status and damage data of each region of the body collected from a damage test, collected data using a measuring environment similar to the measuring environment for a damage test can be obtained.

BRIEF DESCRIPTION OF DRAWINGS

FIG. 5 shows an example of a classification result of the component status.

DESCRIPTION OF EMBODIMENTS

Hereinafter, examples will be described using the drawings.

EXAMPLE 1

In the present example, an example of the method and device to estimate the degree of damage of a device operating in an actual environment will be described. Damage defined in the present example is assumed to be an event in which the initial physical properties when manufactured changes due to the operation of the device or aging such as stress fatigue of mechanical components, damage of materials due to abrasion, insulation degradation of electric appliances, characteristic degradation of electric elements, and degradation of transmittance of optical components.

Figure 1:
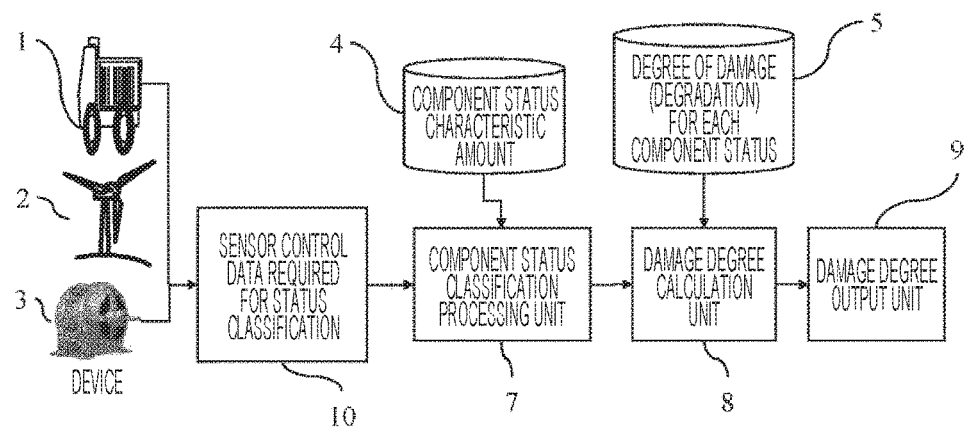
FIG. 1 is a block diagram of processing of a damage estimation method and device of the present invention.
Figure 2:
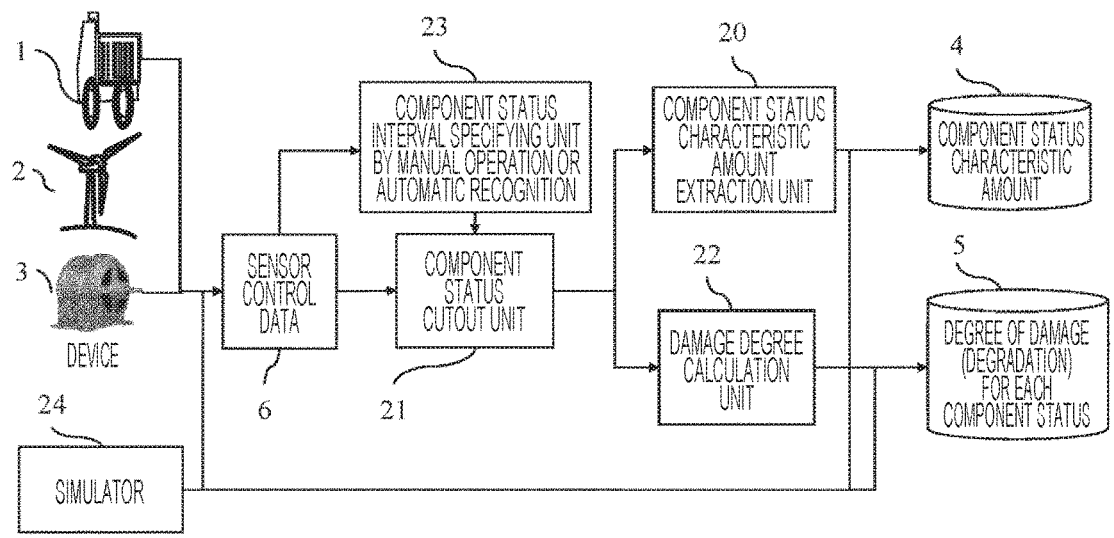
FIG. 2 is a block diagram of processing to calculate a characteristic amount of component status and a degree of damage for each component status.

FIG. 1 is a block diagram of processing of a method and device of estimating the degree of damage of a device during operation described in the present example and FIG. 2 is a block diagram of processing to create a characteristic amount DB(4) of the component status in FIG. 1 and a DB(5) accumulating the degree of damage for each component status.

First, the blocks of processing to create DBs in FIG. 2 will be described.

In FIG. 2, a movable machine 1 is like a dump truck, a mounted machine 2 is like a wind turbine generator, and an electric appliance 3 is like a motor or a generator. Stress fatigue of a body or a housing and abrasion of a movable portion are damage of a device in the movable machine 1 and the mounted machine 2 and insulation degradation of a coil is damage of a device in the example of the electric appliance 3.

In the development of a device, various tests are performed using prototypes to check whether the assumed life is satisfied under usage conditions assumed for the produced device.

In the example of the movable machine 1, for example, the assumed status like a case when the brake is stepped on suddenly or the steering wheel is turned sharply is determined in advance and a stress distribution is measured in various locations of the body to measure whether an excessive stress that could affect the assumed life is applied for each status. Hereinafter, such a status is defined as a component status. A test performed for each component status will be called a component status test.

Figure 3:
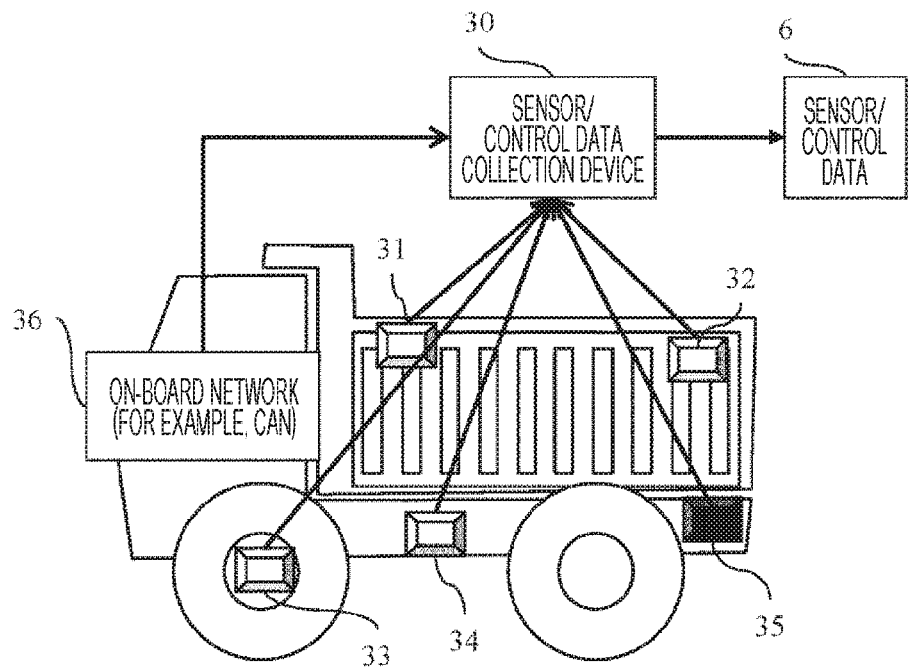
FIG. 3 shows an example of a measuring device during component status test.

An example of a measuring system of a component status test is shown in FIG. 3. FIG. 3 shows a measuring system when the component status test of a dump truck is performed. Sensing information of sensors mounted on the vehicle when manufactured such as driving operation information of a driver, engine speed, cooling water temperature, suspension pressure and the like flows through an on-board network (for example, CAM) 36. Also, strain sensors 31, 32, 33, 34 to measure stress and an acceleration sensor 35 are provided. These sensors measure detailed behavior and stress distributions of a vehicle during component status test and so are specifically mounted sensors. These sensors are sensors that are not mounted when the product is shipped and use sensors that can be retrofitted. Only a few locations are illustrated in FIG. 3, but a few tens to a few hundred sensors may be mounted to make measurements.

Reference sign 30 is a sensor/control data collection device. The sensor/control data collection device 30 performs processing to extract packets related to control data or sensing data by monitoring packets flowing through an on-board network 36 and also makes a data collection of values of strain sensors 31, 32, 33, 34 and an acceleration sensor 35 using an A/D converter. An output, result of the sensor/control data collection device 30 is sensor/control data 6. An example of specifications of the sensor/control data 6 is shown in [Table 1]. The item of data, sampling interval for each piece of data, and number of quantization bits are shown. Data of such specifications is chronologically output. In [Table 1], 12 items are shown, but in reality, many items of sensors mounted on the vehicle body or control information items are output.

TABLE 1

| Item | | Sampling interval | Number of quantization bits |
|---|---|---|---|
| Strain | Region A | 1 kHz | 16 |
| | Region B | 1 kHz | 16 |
| | Region C | 1 kHz | 16 |
| | Region D | 1 kHz | 16 |
| Acceleration | Region a | 10 kHz | 16 |
| | Region b | 10 kHz | 16 |
| | Region c | 10 kHz | 16 |
| CAN | Steering angle | 100 kHz | 16 |
| | Throttle opening | 100 kHz | 16 |
| | Brake | 100 kHz | 16 |
| | Suspension pressure A | 100 kHz | 16 |
| | Suspension pressure B | 100 kHz | 16 |

In the description heretofore, performing a component status test by making actual measurements using actual machines has been described. Instead of actual measurements, output values of a simulator 24 in FIG. 2 may be used. Component status characteristic amounts are designated and chronological changes of the stress distribution, temperature and the like of each region of the body in that component status can be determined by using a simulation method such as the finite element method (FEM) or the like. If control data of the vehicle when the component status is created by simulation is used and the output value of the simulator at that time is used as the sensor output value of each region, sensor/control data as shown in [Table 1] can be acquired.

Reference sign 21 is a component status cutout unit and reference sign 23 is a component status interval designation unit by manual operation or automatic recognition.

Figure 4:
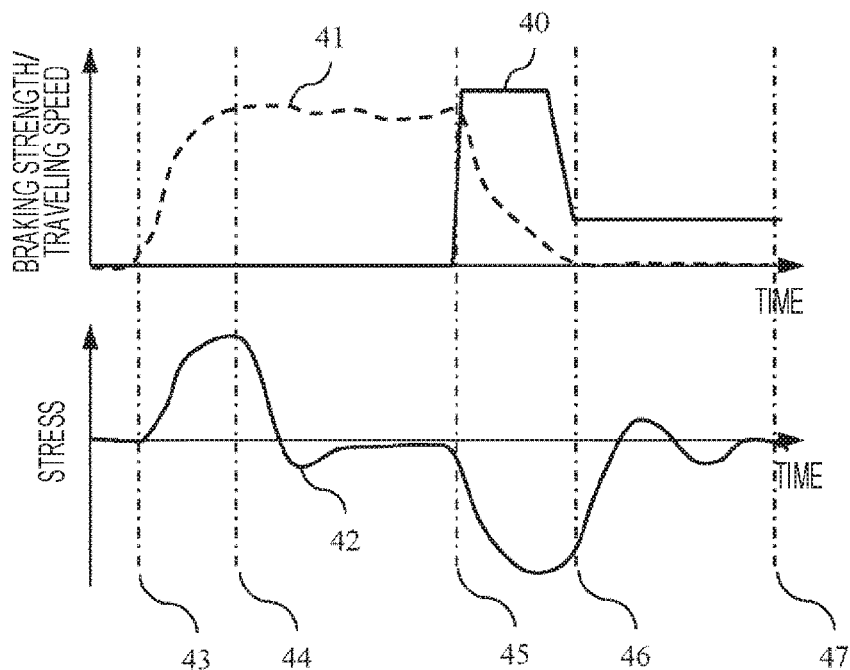
FIG. 4 shows an example of sensor/control data.

The component status cutout unit 21 and the component status interval designation unit 23 by manual operation or automatic recognition perform processing to cut out a true component status interval in a component status test. An example of a measurement result in a component status test is shown in FIG. 4. The component status test is an example of sudden braking of a vehicle. A waveform 40 represents a stepping angle of a brake pedal flowing in CAN data, a waveform 41 represents the traveling speed, and a waveform 42 represents stress changes output by a strain sensor mounted in a certain location of the body.

Data collected in a component status test of sudden braking includes, in addition to an interval from an interval 45 to an interval 46 as a sudden braking interval, a start and acceleration interval from an interval 43 to an interval 44 and a constant-speed interval from the interval 44 to the interval 45. Therefore, it is necessary to cut out a true component status interval from data collected in the component status test. The cutout processing is performed by the component status cutout unit 21. The component status cutout unit 21 performs cutout processing on the interval designated by the component status interval designation unit 23 by manual operation or automatic recognition. The cutout interval may be designated based on the visual observation of a person or by automatic designation processing using control or sensor information.

In the case of manual operation, the waveforms in FIG. 4 are presented to an operator and the operator can cut out an interval by designating the stepping start time 45 of a brake pedal and the time when the traveling speed becomes 0 km/h after the brake pedal being returned. In the stress waveform 42, as shown in an interval from the interval 46 to an interval 47, vibration may remain after the vehicle stops. The component status interval of sudden braking may be designated by including such a vibration interval.

In the case of automatic processing, the time of the interval 45 when the stepping angle of the brake pedal changes can be set as the start time of the interval by detecting the time using threshold processing and the time when the traveling speed becomes 0 km/h can be set as the end time of the interval by detecting the time using the threshold processing. In addition to the above simple threshold processing, various kinds of processing such as the pattern matching method of waveforms can be used for interval detection by the automatic processing.

Data of the cutout interval is sent to a component status characteristic amount extraction unit 20 and a damage degree calculation unit 22.

The component status characteristic amount extraction unit 20 is a unit that extracts characteristic amounts classified and recognized by a component status classification processing unit 7 in FIG. 1 described below from data of the interval cut out by the component status cutout unit 21. Though depending on the classification algorithm used by the component status classification processing unit, in the case of sudden braking, the status of a brake pedal or the threshold parameter of traveling speed used by the interval designation unit of the component status interval designation unit 23 by manual operation or automatic recognition may be set as a characteristic amount or chronological changes of the traveling speed cut out by the component status cutout unit 21 (the waveform 41 cut out from the interval from the interval 45 to the interval 46) may be set as a characteristic amount. In the former case, the component status classification processing unit 7 in FIG. 1 performs classification processing based on the threshold. In the latter case, matching processing (for example, DP matching) of chronological patterns of waveforms is performed.

The extracted characteristic amount is stored in a component status characteristic amount DB 4 for each component status.

The damage degree calculation unit 22 calculates and stores the degree of damage or degree of degradation to which the interval cut out by the component status cutout unit 21 is subjected in a degree of damage (degradation) DB 5 for each component status. For the degree of damage or degree of degradation here, in the example of FIG. 3, the degree of damage when a component status is once experienced is calculated for each region of the strain gauges 31 to 34. As an example of calculation of the degree of damage, first a stress frequency distribution is determined by repeating the stress waveform by a strain sensor in the component status interval to determine the amplitude value of stress and the count thereof using the cycle count method (for example, the rain flow method). By using the frequency distribution and an S-N curve, the degree of damage for one component status can be determined (the material breaks when the integrated value of the degree of damage reaches 1). [Table 2] shows an appearance of the degree of damage entered in the degree of damage DB 5 for each component status. The horizontal direction of the table shows the items of component status and in [Table 2], two items of the sudden braking and the roaring start, but actually, still more component status items exist. The vertical items show mounted sensor positions for a component status test. Actually, positions of a few tens to a few hundred measuring points measured during the component status test stand in a line. Then, the value of the degree of damage by one try of the component status is written at an intersection of each item. Incidentally, the degree of damage in measuring points is shown in [Table 2], but the degree of damage in regions other than measuring points may be determined by using a method such as estimating the degree of damage of regions other than measuring points using a plurality of measuring points and entered.

TABLE 2

|  |  | Degree of damage for each component status | |
|---|---|---|---|
|  |  | Sudden braking | Roaring start |
| Strain | Region A | 1.5e−10 | 1.2e−10 |
|  | Region B | 5.2e−12 | 2.3e−8 |
|  | Region C | 4.5e−7 | 1.2e−10 |
|  | Region D | 5.2e−4 | 8.7e−14 |
| Acceleration | Region a | 6.8e−11 | 3.9e−12 |
|  | Region b | 4.0e−9 | 2.5e−10 |
|  | Region c | 1.9e−10 | 5.9e−9 |

Also, instead of actually measured data, results determined by the simulator 24 may be used. Stress distributions of various regions can be determined by using the simulator 24 and from stress values thereof and the S-N curve, like actually measured values, information shown in [Table 2] can be generated. The result may be entered in the degree of damage DB 5 for each component status and for characteristic amounts of the component status in the component status characteristic amount DB 4, characteristic amounts that can be used for the component status classification processing unit 7 may be extracted and entered in simulation conditions.

In the description heretofore, an example of material damage due to stress is shown, but a case of degradation damage of an insulating material can similarly be handled. In such a case, for example, a test item of rapidly increasing the current flowing through a circuit may be set as a component status item of the component status test and the degree of damage pier one component status may be determined from, the number of tests up to a dielectric breakdown and entered in the DB of the degree of damage DB 5 for each component status. The chronological patterns of changes in currents are entered as the component status characteristic amounts at the time.

In this manner, the component status characteristic amount DB 4 and the degree of damage DB 5 for each, component status are created.

Next, the method, of estimating the degree of damage of an operating device and blocks of processing of the device will be described using FIG. 1.

The movable machine 1, the mounted machine 2, and the electric appliance 3 are devices that are the same type of devices as those for which the component status test in FIG. 2 is performed or devices that can be viewed as the same type of devices in terms of damage. Sensor/control data 10 required for status classification is collected from, these devices. While data for the component status test is collected by arranging many sensors on the device in FIG. 2, data on sensor/control information required for the component status classification processing unit 7 to the status described below is collected for the sensor/control data 10 required for status classification. Also, the data collection here is a data collection under conditions where devices operate in an actual site and devices operate in various statuses in accordance with the actual work environment.

Reference sign 7 is the component status classification processing unit and reference sign 4 is the component status characteristic amount DB described, with reference to FIG. 2. Collection data of the sensor/control data 10 required for status classification is sent to the component status separation processing unit 7 as chronological data. The processing unit of the component status separation processing unit 7 performs classification processing of input chronological data into component statuses with reference to the component status characteristic amount DB 4. As has been described with reference to FIG. 2, the pattern matching method (for example, DP matching) of chronological waveforms and the threshold processing using control information can be cited as methods of classification processing.

FIG. 5 shows an example of the result after the classification processing. FIG. 5 is a result of classifying an example of operating status changes of a dump truck. The transverse direction represents a time change. This is an example in which, as shown in a status 50, the operating status is classified into "Engine start", "Stopped state", "Roaring start", . . . , "Stopped state" by the classification processing unit of the component status separation processing unit 7. The classification result is sent to a damage degree calculation unit 8. The damage degree calculation unit 8 derives the degree of damage corresponding to a classified state from the classification result with reference to the degree of damage DB 5 for each component status. Based on [Table 2], a degree of damage 51 of a region A and a degree of damage 52 of a region B are shown. The degrees of damage other than that of roaring start/sudden acceleration are not illustrated in [Table 2], but are associated by a similar method. Similarly, as shown in a degree of damage 53 of each region, the degree of damage can be calculated for any region entered in the degree of damage DB 5 for each component status even if the region is a region outside the sensor/control data 10 required for status separation being measured during operation.

The result of calculation is output from a damage degree output unit 9.

According to the present embodiment, the degree of damage of each region equivalent to a component status test in which many sensors are arranged can be determined from only sensor/control data required by the component status classification processing unit for chronological damage changes of a device operating at an actual site. Therefore, many measuring points become unnecessary so that measurements can be simplified.

EXAMPLE 2

In the present example, the method and device that estimate the operating status that affects the life of a device in an actual operating environment and the improvement method thereof using a classification result of the operating status and the output value of the degree of damage thereof described in Example 1 will be described.

Figure 6:
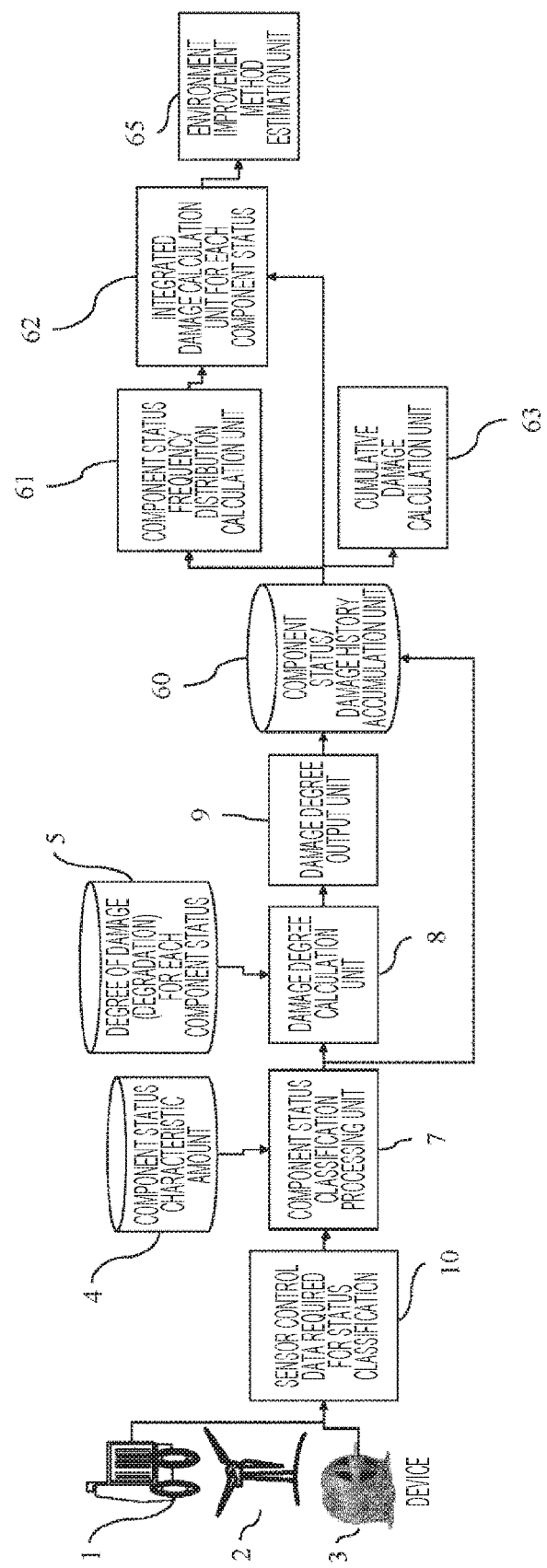
FIG. 6 is a block diagram of processing to estimate a method of improving an actual environment.

FIG. 6 shows a block diagram of processing of the method and device that form the present estimation. The configuration and effect up to the damage degree output unit 9 are the same as those in Example 1 and so the description thereof is omitted.

In a component status/damage degree history accumulation unit DB 60, the component status that changes chronologically and the status of the degree of damage of each region as shown in FIG. 5 are accumulated. Data to be accumulated desirably covers all the time interval in which the device operated.

Figure 10:
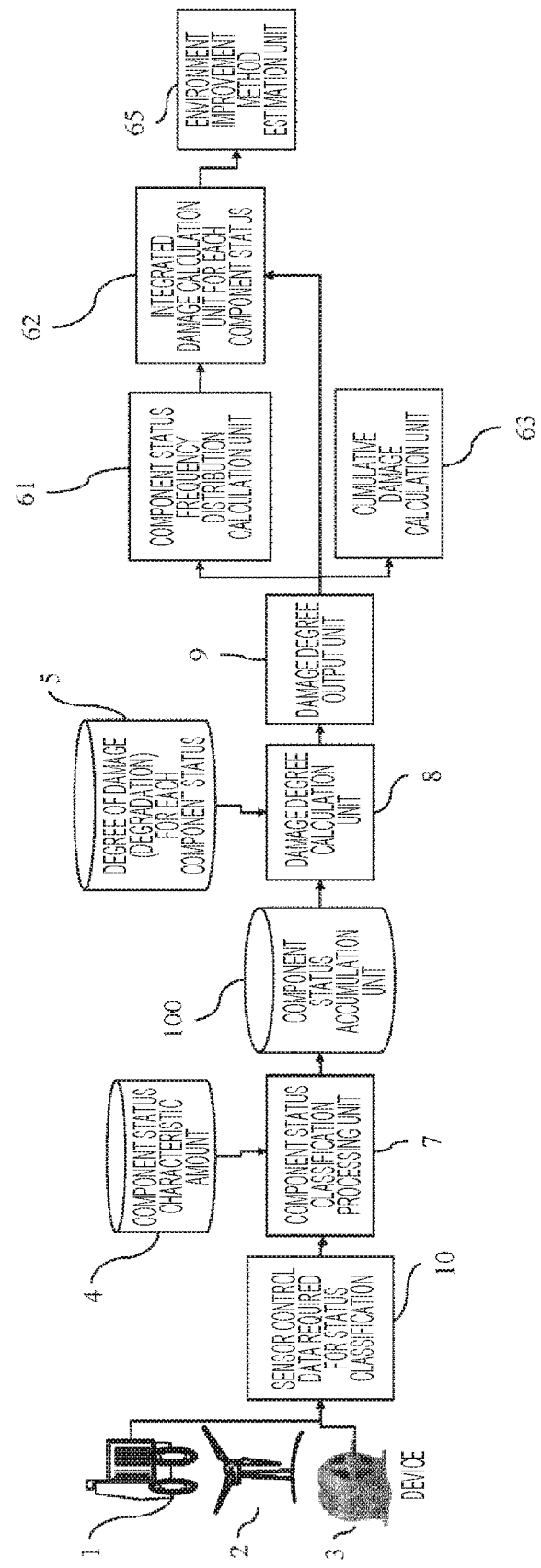
FIG. 10 is a block diagram, of processing to estimate the method of improving the actual environment.

As shown in FIG. 10, instead of the component status/ damage degree history accumulation unit DB, a component status accumulation unit 100 that accumulates the component status that changes chronologically may be provided so that a processing configuration to determine the degree of damage from the degree of damage DB 5 for each, component status and the component status item may be adopted.

Also, a component status frequency distribution calculation unit 61 and a cumulative damage calculation unit 63 are provided.

Figure 7:
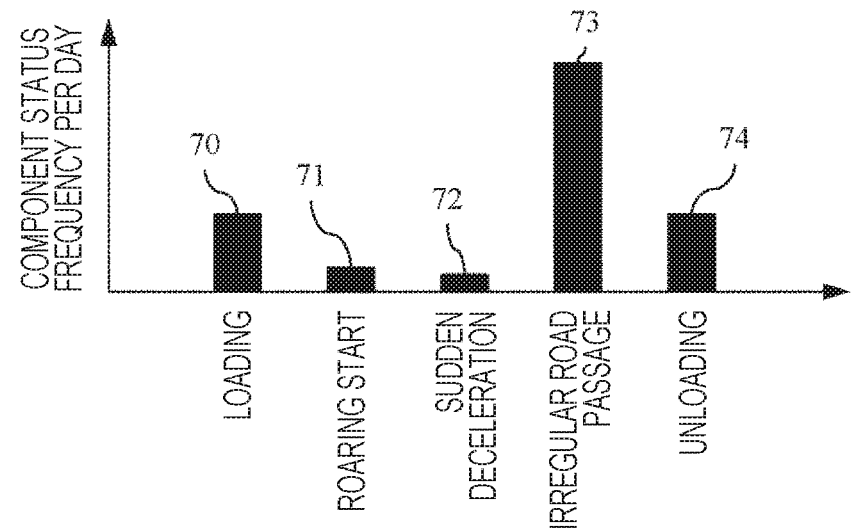
FIG. 7 shows an example of frequencies of the component status in one day.

FIG. 7 is a component status frequency distribution per day determined using the component status frequency distribution calculation unit 61. The frequency distribution of the component status that changes chronologically as shown in FIG. 5 is determined. The frequency distribution of the irregular road passage 73 is the highest (the irregular road passage sets the status of passing one irregular road as a component status). In the work of the day, it is not yet known how much damage is inflicted on the body by the irregular road passage, whose frequency as a component status is high.

Figure 8:
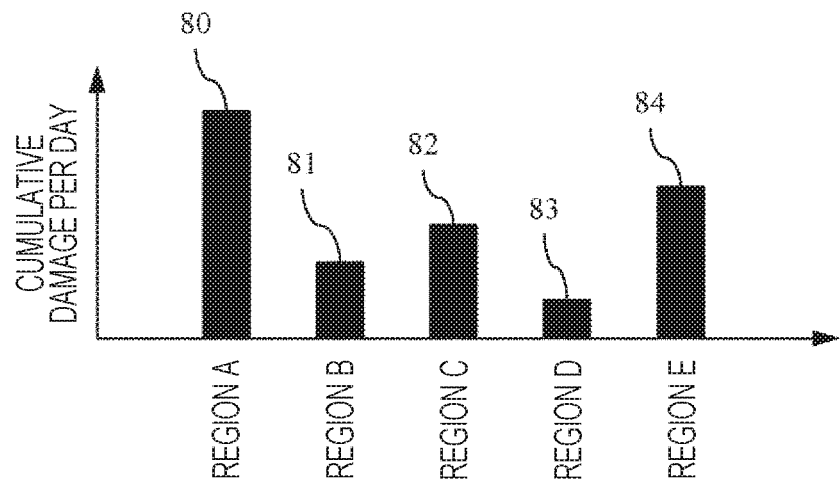
FIG. 8 shows cumulative damage for each region in one day.

FIG. 8 shows the value of cumulative damage inflicted on each region per day in the cumulative damage calculation unit 63. This is the value obtained by integrating for one day the degree of damage in chronological order shown in FIG. 5. It is clear from FIG. 8 that the degree of damage inflicted on the region A is the greatest. One of the features of Example 2 is that damage inflicted on the region A, which is not actually measured, is the greatest is revealed only from sensor or control data required for status classification of the sensor/control data 10 required for status classification.

In this status, however, the reason why the degree of damage inflicted on the region A is the greatest is not known.

Thus, an integrated damage calculation unit 62 for each component status performs processing like (math 1):

Degree of damage of region β in component status α per day=frequency of component status α×degree of damage of region β in component status of α    (math 1)

Figure 9:
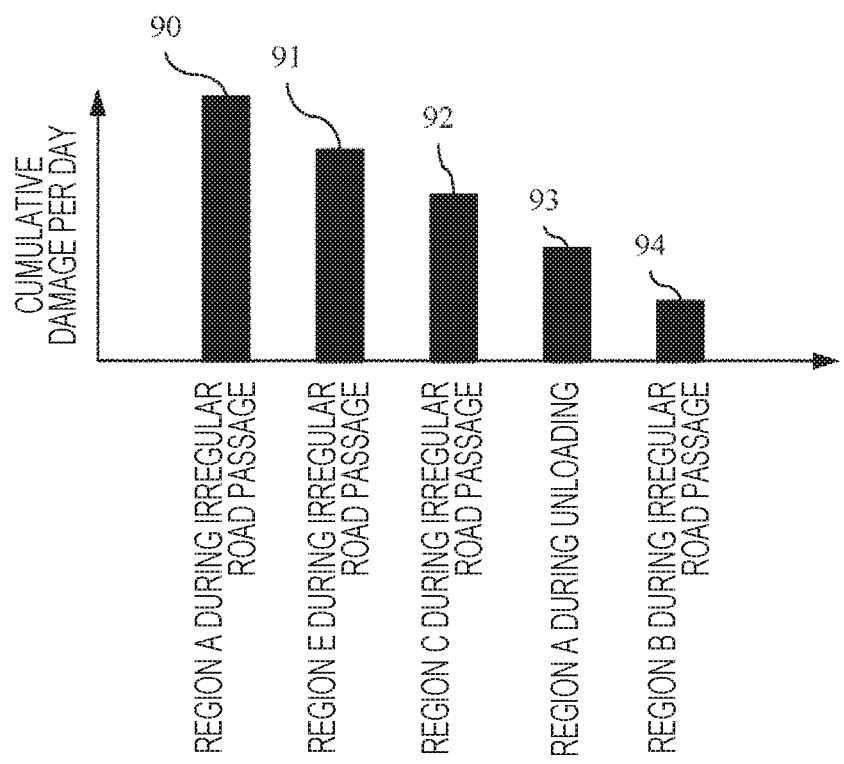
FIG. 9 shows an example of the cumulative damage of each region for each component status.

FIG. 9 shows a result of rearranging a result determined by using (math 1) in descending order of cumulative damage. It is clear from FIG. 9 that damage of the region A during irregular road passage is the greatest and also damage of other regions is great during irregular road passage. That is, it is clear from the above result that great damage is inflicted on the region A during irregular road passage in the operation of one day.

In the above description, the interval for which the cumulative damage is determined is set as one day, but the interval for which the cumulative damage is determined is varied like one work cycle, the same work site, and the same season and depending on the set interval, features of cumulative damage of the interval can be determined.

Reference sign 65 is an environment improvement method estimation unit. Here, the improvement method to reduce damage is estimated based on a result of the integrated damage calculation unit 62 for each component status. In the example of FIG. 9, for example, the fact that more damage is inflicted on an irregular road is known by using threshold processing or the like and the improvement method can be implemented by displaying component statuses of great damage to encourage improvement.

In the above description, as described in the description of the degree of damage, the status of the cumulative degree of damage=1 is the breaking of a material. Thus, the cumulative damage can be converted into the time when the cumulative degree of damage=1 is reached, that is, the remaining life from the inclination of the cumulative damage. If the cumulative damage has an inclination that is gentle and does not affect the assumed life of products, there is no need for improvement even if the cumulative damage is larger than that in other regions and a system that displays an improvement method by taking the idea of such a remaining life into account can be implemented.

According to the present example, the operating status that affects the life of a device in an actual operating environment and the improvement method thereof can be estimated.

EXAMPLE 3

In the present example, the method and device that estimate a damage accumulation region of a device in an actual operating environment using a classification result of the operating status and the output value of the degree of damage thereof described in Example 1 and based on a result thereof, create the optimum maintenance cycle and design guidelines for designing a new device will be described.

Figure 11:
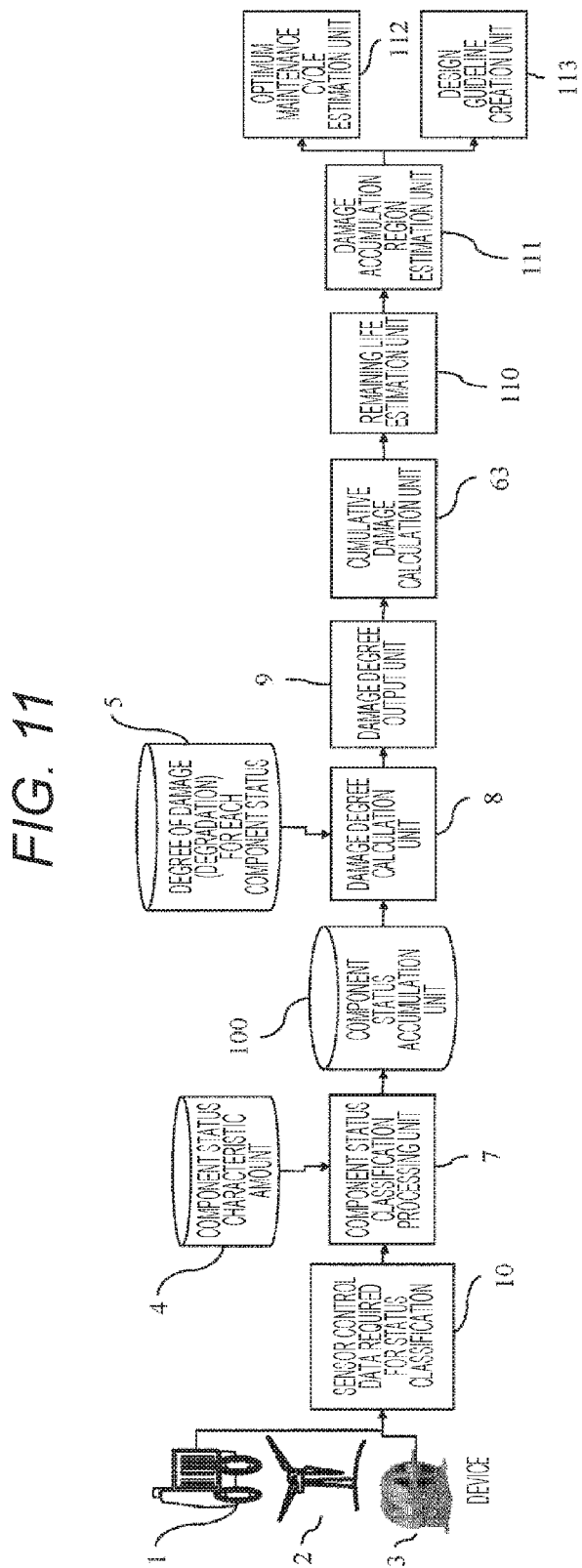
FIG. 11 is a block diagram of processing to create an optimum maintenance cycle and design principles.
Figure 12:
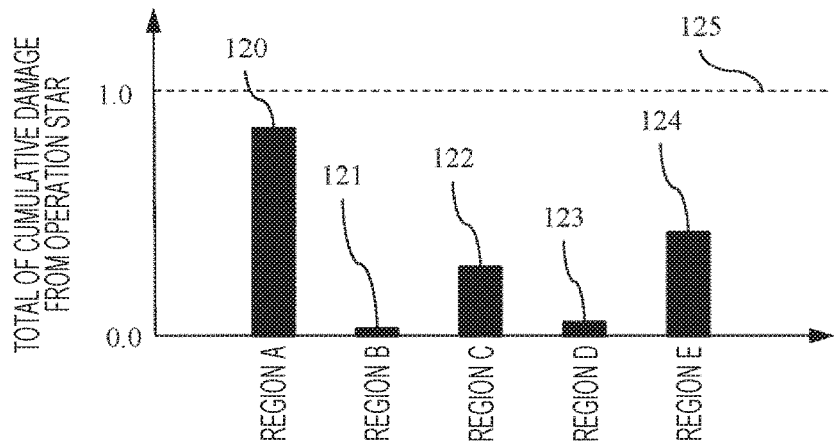
FIG. 12 shows an example of the total of cumulative damage from the start of operation.
Figure 13:
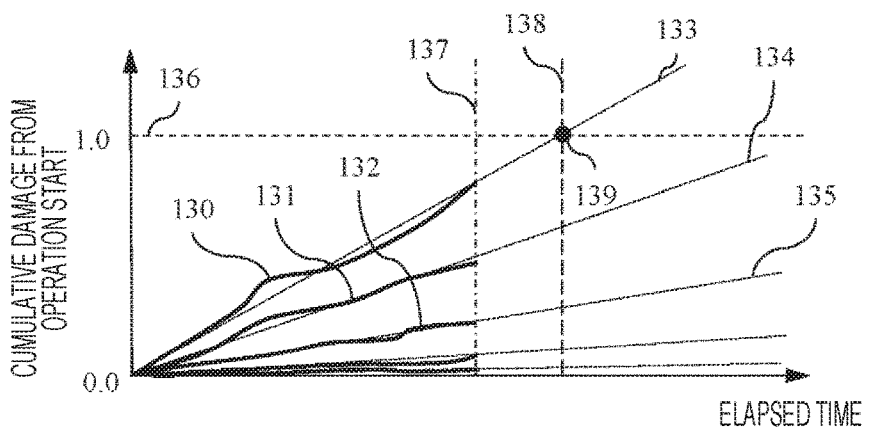
FIG. 13 shows chronological changes of the cumulative damage from the start of operation.

FIG. 11 is a block diagram of processing in the present example. The processing up to the damage degree output unit 9 is the same as in Example 2 and so the description thereof is omitted. The cumulative damage calculation unit 63 is included. Cumulative damage of a device from the operation start to the current time is shown in FIG. 12. In FIG. 12, reference sign 125 shows a boundary line representing the cumulative damage=1 and the graph of a region A 120 is close to the boundary line 125, which indicates that the end of life is close at hand. However, the period of life is not known from FIG. 12. Thus, the remaining life is estimated by a remaining life estimation unit 110. FIG. 13 is a graph showing an example of a remaining life estimation method. The horizontal axis represents the elapsed time and the vertical axis represents the cumulative damage from the operation start. A graph 130 shows a time change of cumulative damage of the region A, a graph 131 shows a time change of cumulative damage of the region E, and a graph 132 shows a time change of cumulative damage of the region C. A graph 136 represents a boundary line of the cumulative damage=1 and a time 137 represents the current time.

For the remaining life estimation, extrapolation processing using a least squares method approximation curve is performed from a time change of cumulative damage. Extrapolated straight lines of the graphs 130, 131, 132 are graphs 133, 134, 135 respectively. From the extrapolated straight lines, the life period when the cumulative damage=1 can be estimated. For example, the life period of the region A is a time 138 of an intersection 139 of the graph 136 and the graph 133. In this manner, the remaining life estimation unit 110 performs estimation processing of the life. If a part is replaced or repaired before the end of life, the extrapolated straight line may be determined by accumulation after setting the replacement period as the start time and if load variations of the device are huge, a least squares method approximation may be made using the interval of the latest few days/few months.

Reference sign 112 is an optimum maintenance cycle estimation unit and reference sign 113 is a design guideline creation unit. The optimum maintenance cycle estimation unit 112 generates a notification of replacement or repair before, among regions of the whole device, a region with the smallest remaining life reaches the end of life (the time 138 in the example of FIG. 13). Incidentally, the value of an S-N curve determined for calculation of the degree of damage is a value when breaking has a certain probability (for example, the probability of breaking after the number of repetitions of the S-N curve is 50%). Therefore, in consideration of the probability, processing of moving up a notification time from the time 138 is possible.

In the past, action of moving up the maintenance cycle was taken because the operating time is long or operating loads are heavy, but tasks of how much to move up and whether the maintenance cycle in the past is suitable remain. According to the present example, however, a region on which more damage is inflicted can be known and the period when the region reaches the end of life can also be revealed and thus, the optimum maintenance cycle supported by evidence can be estimated.

The design guideline creation unit 113 is a processing unit that creates design guidelines when the design life assumed while designed and the life while operated at an actual site are compared and a product is newly designed or designed by modification. An overview of the processing will be described using FIG. 13. The end of life of the region A at an actual site is the time 138. If the life is the same as the design life, there is no need to change the design guidelines. If, however, the period of the time 138 is earlier than the design life, design guidelines are insufficient and the strength lacks. In such a case, the design guidelines are reviewed to reinforce the region A. Conversely, if the time 138 is significantly longer than the design life, design guidelines for the region can be determined to be overstrengthened. If the over-strength entails higher product cost, the cost can be reduced by lowering the strength until the design life is reached.

If the life at an actual site depends on the site used (the country or the region), a device having suitable strength for the location to be used by changing the design strength depending on the location to be used can be provided. In a location where the design strength may be weakened, the product cost can be reduced by lowering the product strength and in a location where product strength is required, an unexpected failure due to insufficient strength can be reduced. In addition, as shown in FIG. 13, a region whose remaining life is short can be visualized. Therefore, the location where design guidelines need to be changed can be presented by a visualization method as shown in FIG. 13.

In the past, design guidelines of a device was created by assuming an actual operating environment when designed and so the grounds of design guidelines were unclear. According to the present example, the grounds are clarified and optimum design guidelines can be created.

EXAMPLE 4

Figure 14:
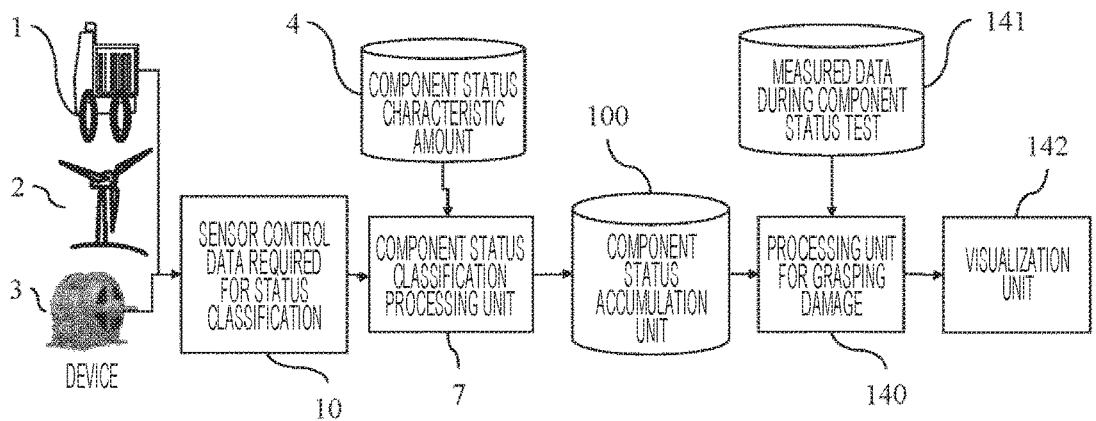
FIG. 14 is a block diagram of processing to grasp damage.

Next, the configuration that puts together the configurations to implement Example 2 and Example 3 is shown in FIG. 14. The configuration and effect up to the component status classification processing unit 7 are the same as the configuration described with reference to FIG. 10 and so the description thereof is omitted.

The method of creating the component status characteristic amount DB 4 and the degree of damage DB 5 for each component status described with reference to FIG. 2, the damage degree calculation unit 8 described with reference to FIGS. 1 and 10, the method of estimating the operating status that affects the life of a device and the improvement method thereof described in Example 2, and the method of estimating a damage accumulation region of a device in an actual operating environment and based on a result thereof, creating the optimum maintenance cycle and design guidelines for designing a new device described in Example 3 can be put together as a processing unit 140 to grasp damage. DB needed to be referred to by the processing unit is a measured data DB 141 during component status test. Example 2 and Examples 3 are shown as examples of processing by the processing unit 140 to grasp damage, but by associating the component status that changes chronologically of a device operating at a site and data collected during component status test, data that cannot be collected during site operation can be estimated based on data collected during component status test.

EXAMPLE 5

In the present example, the method and device that detect the damage status of a device operating in a remote site by connecting the component status separation processing unit 7 and the component status accumulation unit 100 via a wireless or wire communication line will be described.

Figure 15:
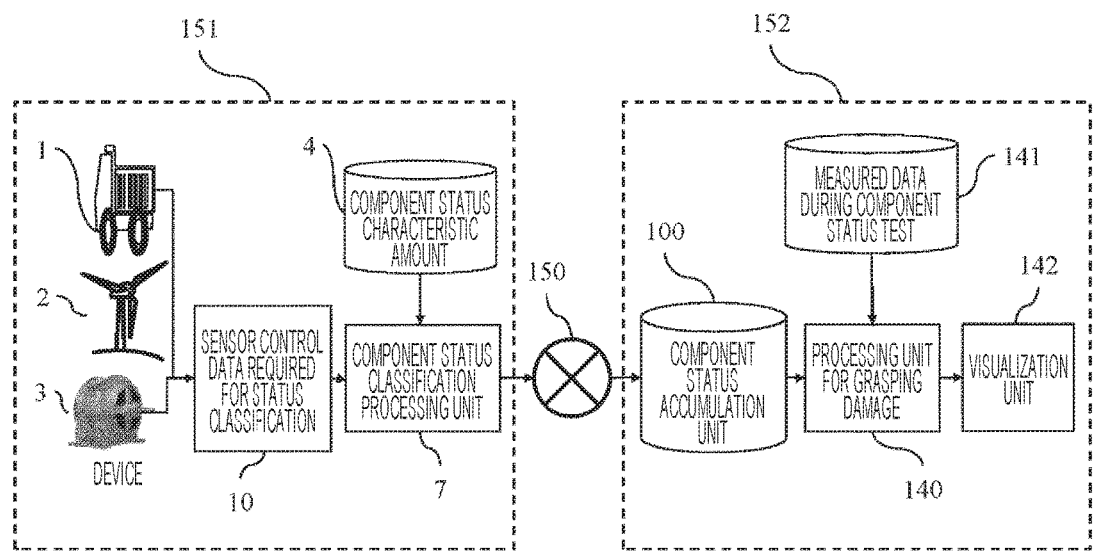
FIG. 15 shows an example using a communication line.

FIG. 15 is a block diagram of processing of a device described in the present example. The component status separation processing unit 7 and the component status accumulation unit 100 are connected via a wireless or wire communication line 150.

The present example is implemented by a device-side device 151 mounted on a device and constructed of a PC or a dedicated circuit board, a computer server 152 installed in a remote site away from the device and the like. In FIG. 15, one unit of the device-side device 151 is depicted, but many devices operating worldwide may be connected to collect the damage status of each device.

Information flowing between the component status separation processing unit 7 and the component status accumulation unit 100 is the component status that changes chronologically (the status 50 in FIG. 5). Thus, the start time of a component status, ID information that identifies the component status, and if necessary, the end time of the component status (the start time of the next component status may be substituted) may be sent. Thus, the amount of information is less than the sensor/control data 10 required for status separation. Much more, compared with the sensor/control data 6 collected during component status measurement in FIG. 2, a very small amount of transfer information is enough. If the communication environment in which the device is placed is very bad, the sensor/control data 10 required for status separation and sensor/control data 6 cannot be transferred, but the number of environments in which the amount of information of the component status separation processing unit 7 can be transferred is very large. In the case of satellite communication in which restrictions of the amount of communication are very limited, only frequency information of the component status per day shown in FIG. 7 may be sent. In that case, the frequency count of each component status item may be sent once a day so that the amount of transfer information can substantially be reduced. If the frequency distribution in FIG. 7 is known, cumulative damage per day for each region in FIG. 8 can be determined from (math 2).

Degree of damage of region β per day=Σ (frequency
of component status α×degree of damage
region β in component status α)   (math 2)

where Σ is an integrated value of the region β in all component statuses.

FIG. 9 can be determined by using (math 1) described above and cumulative damage from the operation start due to an elapsed time in FIGS. 12 and 13 can be determined from an integrated value of (math 2), though the time resolution is one day.

If the communication capacity is large and the time resolution is required, instead of in units of days, the sending interval may further be shortened (for example, every hour). Conversely, if the communication capacity is small, the accumulated time may be prolonged so that the sending interval is, for example, every week.

A feature of the present example is that even in an environment in which the communication capacity is small, a processing result equivalent to that of a component status test measured by mounting many sensors on a device can be obtained.

Sending only the classified component status has been described, but values of the degree of damage (the degree of damage 51 of the region A and the degree of damage 52 of the region B, and the degree of damage 53 of the region in FIG. 5) flowing between the damage degree output unit 9 and the component status/damage degree history accumulation unit DB 60 in FIG. 6 may be sent. In that case, an effect of a lower load of the computer server 152 is achieved.

The wireless or wire communication line 150 has been described as a wireless or wire communication line, but data may be recorded in a storage medium and then, the storage medium may be transported. In that case, the present method and device can be operated in a location where there is no communication line and also a storage medium of a small storage lift can be used.

REFERENCE SIGNS LIST 1 movable machine
2 mounted machine
3 electric appliance
4 component status characteristic amount DB
5 degree of damage entered in the degree of damage DB for each component status
7 component status classification processing unit
8 damage degree calculation unit
9 damage degree output unit
10 sensor/control data required for status classification

The invention claimed is:

1. A damage estimation device that estimates a degree of damage to a device in operation, the damage estimation device comprising:
a processor configured to classify an operation of the device over time into a plurality of predetermined operating statuses based on a database storing a characteristic amount for each of the plurality of predetermined operating statuses;
a computer-readable storage unit that
stores the characteristic amount for classification processing by the processor; and
stores a degree of damage of various regions of the device for each of the plurality of predetermined operating statuses that are defined as component statuses, wherein the degree of damage has been measured or calculated using a simulation in advance for each component status,
wherein the processor is configured to:
collect sensor/control data required for device status classification,
classify the component status,
calculate a classified result and the degree of damage corresponding thereto using the degree of damage stored for each component status, and
output the degree of damage.

2. The damage estimation device according to claim 1, wherein
the degree of damage output and an item of the component status classified are stored in the computer-readable storage unit and
based on an accumulation result, a frequency distribution of the component status is created.

3. The damage estimation device according to claim 2, wherein
from the frequency distribution of the component status created, integrated damage of each region is output for each component status.

4. The damage estimation device according to claim 3, wherein
an effective component status to reduce a degree of integrated damage is output based on the degree of the integrated damage of each region for each of the component status.

5. A damage estimation device that estimates a degree of damage to a device in operation, the damage estimation device comprising:
a processor configured to classify an operation of the device over time into a plurality of predetermined operating statuses based on a database storing a characteristic amount for each of the plurality of predetermined operating statuses;
a computer-readable storage unit that
stores the characteristic amount for classification processing by the processor; and
stores a degree of damage of various regions of the device for each of the plurality of predetermined operating statuses that are defined as component statuses, wherein the degree of damage has been measured or calculated using a simulation in advance for each component status,
wherein the processor is configured to:
collect sensor/control data required for device status classification,
classify the component status,
accumulate a classified result,
calculate an accumulated component status and the degree of damage corresponding thereto using the degree of damage stored for each component status, and
create a frequency distribution of the component status based on an accumulation result.

6. The damage estimation device according to claim 5, wherein
from the frequency distribution of the component status created, a degree of integrated damage of each region is output for each component status.

7. The damage estimation device according to claim 6, wherein
an effective component status to reduce the degree of integrated damage is extracted and
a notification that the component status will be improved is sent based on the degree of the integrated damage of each region for the each component status created.

8. A damage estimation device that estimates a degree of damage to a device in operation, the damage estimation device comprising:
a processor configured to classify an operation of the device over time into a plurality of predetermined operating statuses based on a database storing a characteristic amount for each of the plurality of predetermined operating statuses;
a computer-readable storage unit that
stores the characteristic amount for classification processing by the processor; and stores a degree of damage of various regions of the device for each of the plurality of predetermined operating statuses that are defined as component statuses, wherein the degree of damage has been measured or calculated using a simulation in advance for each component status, wherein the processor is configured to:
collect sensor/control data required for device status classification,
classify the component status,
accumulate a classified result,
calculate an accumulated component status and the degree of damage corresponding thereto using the degree of damage stored for each component status, and
calculate, based on a result of calculation, cumulative damage for each region.

9. The damage estimation device according to claim 8, wherein
an optimum maintenance cycle or design guidelines are calculated
based on a region for which the cumulative damage calculated is accumulated and
a remaining life calculated from the cumulative damage.

10. A damage estimation device that estimates a degree of damage to a device in operation, the damage estimation device comprising:
a processor configured to classify an operation of the device over time into a plurality of predetermined operating statuses based on a database storing a characteristic amount for each of the plurality of predetermined operating statuses;
a computer-readable storage unit that
stores the characteristic amount for classification processing by the processor;
accumulates a result classified by the processor; and
accumulates the component status that changes chronologically of various regions of the device for each of the plurality of predetermined operating statuses that are defined as component statuses, wherein the component status has been measured or calculated using a simulation in advance for each component status, wherein
the processor is configured to:
collect sensor/control data required for device status classification,
classify the component status,
accumulate a classified result,
refer to the component status accumulated in the computer-readable storage unit and measured data during a component status test corresponding thereto, and
grasp a damage status from physical change information.

11. A damage estimation method for estimating a degree of damage to a device in operation, the method comprising:
performing, via a processor, component status classification processing which classifies an operation of the device over time into a plurality of predetermined operating statuses based on a database storing a characteristic amount for each of the plurality of predetermined operating statuses;
storing, in a computer-readable storage unit, a characteristic amount of a component status in which the characteristic amount of the component status classification processing is stored;
storing a degree of damage of various regions of the device for each of the plurality of predetermined operating statuses that are defined as component statuses, wherein the degree of damage has been measured or calculated using a simulation in advance for each component status;
collecting sensor/control data required for device status classification;
classifying the component status by the component status classification processing;
calculating a classified result and the degree of damage corresponding thereto using the degree of damage stored for each component status; and
outputting the degree of damage.

12. The damage estimation method according to claim 11, wherein
the degree of damage output and items of the component status classified are accumulated as a component status/damage history and
based on an accumulation result, a frequency distribution of the component status is created.

13. The damage estimation method according to claim 12, wherein
from the frequency distribution of the component status created, integrated damage of each region is output for each component status.

14. The damage estimation method according to claim 13, wherein
an effective component status to reduce a degree of integrated damage is output based on the degree of the integrated damage of each region for the each component status.

15. A damage estimation method for estimating a degree of damage to a device in operation, the method comprising:
performing, via a processor, component status classification processing which classifies an operation of the device over time into a plurality of predetermined operating statuses based on a database storing a characteristic amount for each of the plurality of predetermined operating statuses;
storing, in a computer-readable storage unit, a characteristic amount of a component status in which the characteristic amount of the component status classification processing is stored;
storing a degree of damage of various regions of the device for each of the plurality of predetermined operating statuses that are defined as component statuses, wherein the degree of damage has been measured or calculated using a simulation in advance for each component status;
collecting sensor/control data required for device status classification;
classifying the component status by the component status classification processing;
accumulating a classified result;
calculating an accumulated component status and the degree of damage corresponding thereto using the degree of damage stored for each component status; and
creating a frequency distribution of the component status.

16. The damage estimation method according to claim 15, wherein
from the frequency distribution of the component status created, a degree of integrated damage of each region is output for each component status.

17. The damage estimation method according to claim 16, wherein
an effective component status to reduce the degree of integrated damage is extracted and a notification that the component status will be improved is sent based on the degree of the integrated damage of each region for the each component status created.

18. A damage estimation method for estimating a degree of damage to a device in operation, the method comprising:
performing, via a processor, component status classification processing which classifies an operation of the device over time into a plurality of predetermined operating statuses based on a database storing a characteristic amount for each of the plurality of predetermined operating statuses;
storing, in a computer-readable storage unit, a characteristic amount of a component status in which the characteristic amount of the component status classification processing is stored;
storing a degree of damage of various regions of the device for each of the plurality of predetermined operating statuses that are defined as component statuses, wherein the degree of damage has been measured or calculated using a simulation in advance for each component status;
collecting sensor/control data required for device status classification;
classifying the component status by the component status classification processing;
accumulating a classified result;
calculating an accumulated component status and the degree of damage corresponding thereto using the degree of damage for each component status; and
calculating, based on the degree of damage for each component status, cumulative damage for each region.

19. The damage estimation method according to claim 18, wherein
an optimum maintenance cycle or design guidelines are calculated based on a region for which the cumulative damage calculated is accumulated and
a remaining life calculated from the cumulative damage.

20. A damage estimation method for estimating a degree of damage to a device in operation, the method comprising:
performing, via a processor, component status classification processing which classifies an operation of the device over time into a plurality of predetermined operating statuses based on a database storing a characteristic amount for each of the plurality of predetermined operating statuses;
storing, in a computer-readable storage unit, a characteristic amount of a component status in which the characteristic amount of the component status classification processing is stored;
accumulating a result classified by the component status classification processing;
accumulating the component status that changes chronologically of various regions of the device for each of the plurality of predetermined operating statuses that are defined as component statuses, wherein the component status has been measured or calculated using a simulation in advance for each component status;
collecting sensor/control data required for device status classification;
classifying the component status by the component status classification processing;
accumulating a classified result;
referring to the component status accumulated and measured data during a component status test corresponding thereto, and
grasping a damage status from physical change information.

* * * * *